United States Patent
Kuroki et al.

(10) Patent No.: US 8,523,264 B2
(45) Date of Patent: Sep. 3, 2013

(54) WINDSHIELD GLASS SUPPORT STRUCTURE

(75) Inventors: Yusuke Kuroki, Yokohama (JP); Kanako Takikawa, Atsugi (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 0 days.

(21) Appl. No.: 13/640,414

(22) PCT Filed: Apr. 11, 2011

(86) PCT No.: PCT/JP2011/058964
§ 371 (c)(1),
(2), (4) Date: Oct. 10, 2012

(87) PCT Pub. No.: WO2011/129286
PCT Pub. Date: Oct. 20, 2011

(65) Prior Publication Data
US 2013/0026779 A1    Jan. 31, 2013

(30) Foreign Application Priority Data
Apr. 14, 2010   (JP) .................. 2010-092796

(51) Int. Cl.
*B62D 25/08*    (2006.01)
(52) U.S. Cl.
USPC ....................... 296/96.21; 296/192
(58) Field of Classification Search
USPC ..................... 296/96.21, 192, 201
See application file for complete search history.

(56) References Cited

U.S. PATENT DOCUMENTS

| 7,540,557 | B2 | 6/2009 | Shimura | |
|---|---|---|---|---|
| 7,854,473 | B2* | 12/2010 | Kuroita et al. | 296/192 |
| 8,240,746 | B2* | 8/2012 | Yamagishi et al. | 296/192 |
| 2008/0116721 | A1 | 5/2008 | Shimura | |

FOREIGN PATENT DOCUMENTS

| JP | 63-47967 U | 3/1988 |
|---|---|---|
| JP | 2003-327165 A | 11/2003 |
| JP | 2006-206004 A | 8/2006 |
| JP | 2007-106380 A | 4/2007 |
| JP | 2008-260331 A | 10/2008 |
| JP | 4207006 B1 | 1/2009 |

* cited by examiner

*Primary Examiner* — Lori Lyjak
(74) *Attorney, Agent, or Firm* — Foley & Lardner LLP

(57) ABSTRACT

A windshield glass support structure includes a windshield glass (1), a lower end support member (3) supporting a lower end portion of the windshield glass, and a dynamic damper (7) provided at a position corresponding to a resonance antinode of the lower end support member. The dynamic damper is an additional vibration system including an additional spring and an additional mass with respect to a main vibration system in which a glass support rigidity of the lower end support member is a main spring and the windshield glass is a main mass. A resonance frequency of the dynamic damper is set in a frequency band in which the additional mass vibrates in an antiphase with respect to a vibration phase in which the lower end portion of the windshield glass vibrates in a resonance node in a front-back direction of the vehicle caused by a vibration input.

4 Claims, 9 Drawing Sheets

WINDSHIELD GLASS SUPPORT STRUCTURE

TECHNICAL FIELD

The present invention relates to a windshield glass support structure applied to an electric vehicle to support a lower end portion of a windshield glass.

BACKGROUND ART

Windshield glass support structures for effectively reducing muffled sound are conventionally known. According to such structures, braces having a closed cross-section are arranged at the positions corresponding to resonance nodes in each resonance mode in an air box structure with a closed cross-section (for example, refer to Patent Document 1).

CITATION LIST

Patent Literature

Patent Document 1: Japanese Patent Unexamined Publication No. 2006-206004

SUMMARY OF INVENTION

However, in the conventional windshield glass support structures, when the braces are arranged in the positions corresponding to the resonance nodes in the vehicle width direction to control a tertiary resonance mode, for example, a primary resonance frequency is also affected by the braces. When the primary resonance frequency approaches a frequency of a resonance phenomenon inside the vehicle, low frequency noise such as road noise and muffled sound tends to be generated.

In other words, the resonance frequency in which the windshield glass is a mass and the support rigidity of the windshield glass is a spring constant varies in accordance with the variation of at least one of the mass and the spring constant. When the braces that form the closed cross-section are arranged in the positions corresponding to the resonance nodes in the vehicle width direction, the support rigidity, that is, the spring constant of the windshield glass, increases. Therefore, when the braces are arranged to control a specific resonance mode (for example, the tertiary resonance mode), the resonance frequency of another resonance mode (for example, the primary resonance mode) is also affected by the braces.

Note that "low frequency noise" used herein means noise inside the vehicle caused by primary resonance at the bottom of the windshield glass. Examples of the low frequency noise include road noise (such as unpleasant rasping sound) caused by the contact between the tires and the road surface during moving, and noise called muffled sound (such as unpleasant buzzing sound) caused by an inertial force of the engine.

The present invention has been made in view of the above-described conventional problem. It is an object of the present invention to provide a windshield glass support structure capable of suppressing generation of low frequency noise during moving caused by a windshield glass that is a vibration system so as to ensure quietness in a vehicle.

A windshield glass support structure according to an embodiment of the present invention includes: a windshield glass; a lower end support member extending in a width direction of a vehicle to support a lower end portion of the windshield glass; and a dynamic damper provided at a position corresponding to a resonance antinode of the lower end support member in the width direction in a case where both ends of the windshield glass in the width direction are resonance nodes. The dynamic damper is an additional vibration system including an additional spring and an additional mass with respect to a main vibration system in which a glass support rigidity of the lower end support member is a main spring and the windshield glass is a main mass. A resonance frequency of the dynamic damper is set in a frequency band in which the additional mass vibrates in an antiphase with respect to a vibration phase in which the lower end portion of the windshield glass vibrates in a resonance mode in a front-back direction of the vehicle caused by a vibration input.

DESCRIPTION OF EMBODIMENTS

Hereinafter, an embodiment of a windshield glass support structure of the present invention will be described below according to Examples 1 to 3.

Example 1

Figure 1:
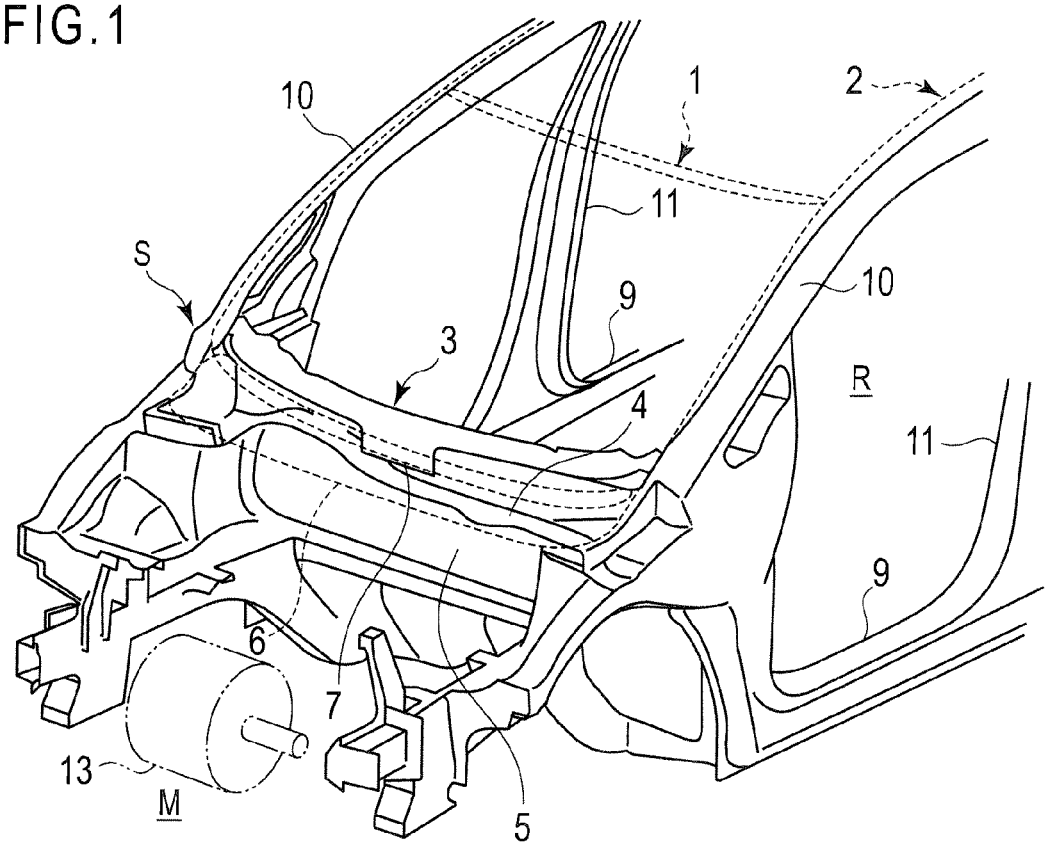
FIG. 1 is a perspective view showing an electric vehicle to which a windshield glass structure according to Example 1 is applied.

FIG. 1 is a perspective view showing an electric vehicle (one of electrically-powered vehicles) to which a windshield glass support structure according to Example 1 is applied. FIGS. 2 to 6 are views showing the windshield glass support structure and each component according to Example 1. Hereinafter, a constitution of this example will be explained with reference to FIGS. 1 to 6.

As shown in FIG. 1, the electric vehicle adopting the windshield glass structure according to Example 1 includes a body S, a windshield glass 1, a roof header 2 and a cowl top 3 (a lower end support member). The electric vehicle further includes a dash upper panel 4, a dash lower panel 5, a cowl cover 6 and a dynamic damper 7.

As shown in FIG. 1, the body S has a box-type monocoque body construction without frame composed of a number of body panels connected by a welding method such as spot welding. The other components of the body S other than the cowl top 3, the dash upper panel 4 and the dash lower panel 5 include, for example, a pair of side members 9, a pair of front pillars 10 and a pair of center pillars 11.

The windshield glass 1 shown in FIG. 1 is a front window to block a wind against the vehicle. An upper end portion of the windshield glass 1 is supported by the roof header 2 extending in a vehicle width direction to serve as an upper end support member. A lower end portion of the windshield glass 1 is supported by the cowl top 3 extending in the vehicle width direction to serve as a lower end support member. Further, both side portions of the windshield glass 1 are supported by indented portions of the pair of the front pillars 10.

As shown in FIGS. 2(a) and 2(b), the cowl top 3 has a curved shape formed in such a manner that a center portion projects toward the front of the vehicle (in the direction of an arrow FR) and both side portions extend toward the back of the vehicle. The cowl top 3 is fixed along an upper end portion of the dash upper panel 4 by welding (see FIGS. 3 and 4). The cowl top 3 includes a glass support surface 3a to support the inner surface of the lower end portion of the windshield glass 1. Both side portions 3b and 3c of the cowl top 3 are fixed to lower portions of the front pillars 10. An adhesive 12 is provided between the glass support surface 3a of the cowl top 3 and the inner surface of the lower end portion of the windshield glass 1, so that the lower end portion of the windshield glass 1 is fixed to the glass support surface 3a (see FIG. 3(b)).

Figure 3:
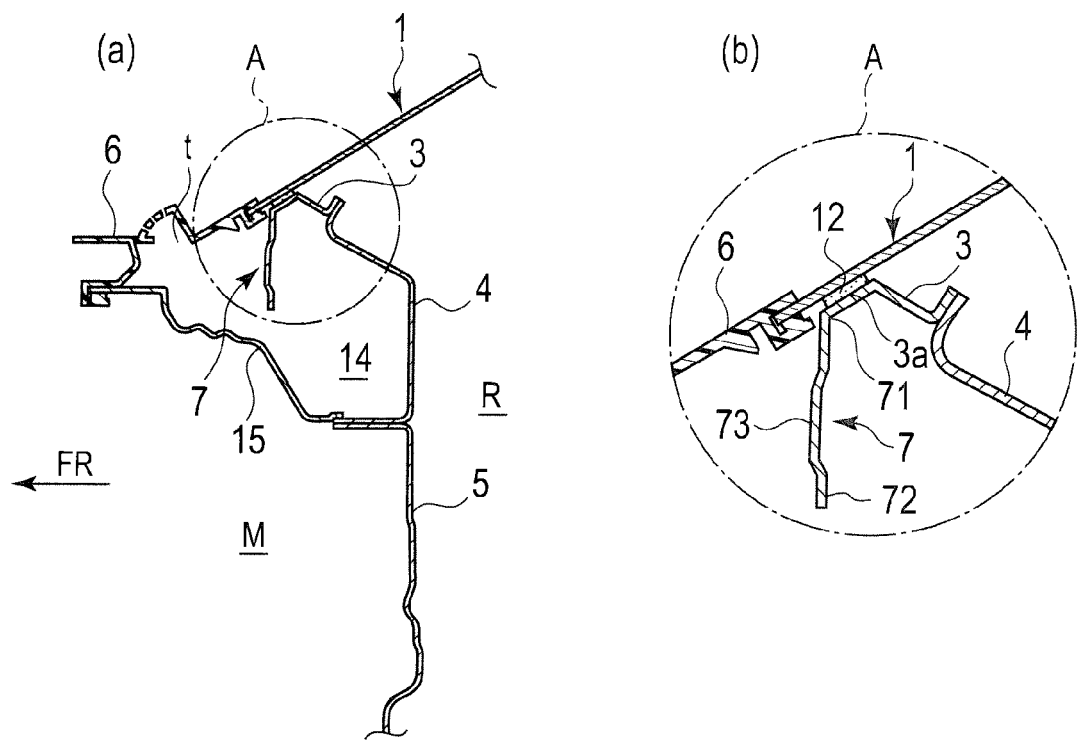
FIG. 3($a$) is a cross-sectional view and FIG. 3($b$) is an enlarged view each showing a center portion in a vehicle width direction in the windshield glass support structure according to Example 1.
Figure 4:
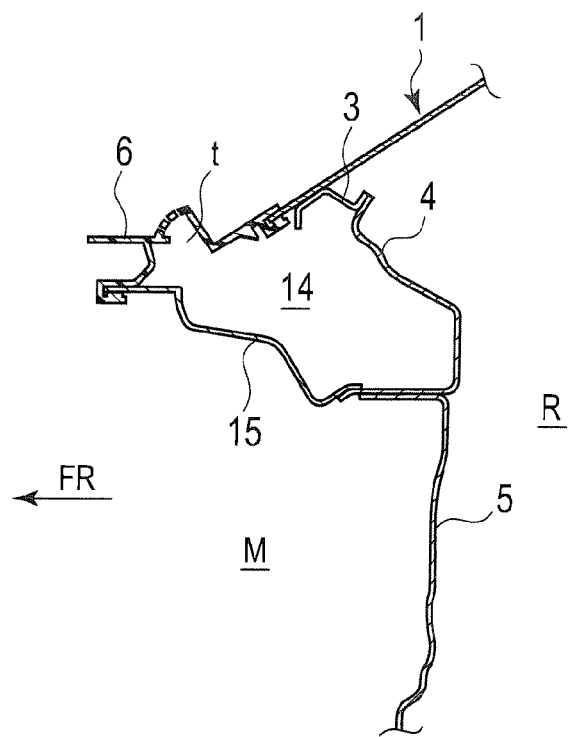
FIG. 4 is a cross-sectional view showing a side portion in the vehicle width direction in the windshield glass support structure according to Example 1.

The dash upper panel 4 and the dash lower panel 5 are vertically connected to each other by welding to compose a dash panel as shown in FIGS. 3 and 4. The dash panel divides the inside of the body S into a motor room M on the front side of the vehicle and an interior space R on the back side of the vehicle. As shown in FIG. 1, an electric motor 13 as a driving source is mounted in the motor room M. In addition, seats (not shown in the figure) on which passengers sit are installed in the interior space R.

The cowl cover 6 serves as a covering member for an air box 14 made of a soft material such as synthetic resin. As shown in FIGS. 3 and 4, the air box 14 is composed of the cowl top 3 supporting the inner surface of the lower end portion of the windshield glass 1, the dash upper panel 4, and a cowl extension panel 15. The cross-section of the air box 14 is an open cross-section in which a gap t is continuously provided in the vehicle width direction. In other words, the gap t is provided between the end portion of the cowl top 3 and the end portion of the cowl extension panel 15 on the upper side of the air box 14. Accordingly, box rigidity of the air box 14 is reduced to a lower level so as to ensure pedestrian protection. The cowl cover 6 covers the gap t provided on the upper side of the air box 14, and is fixed to hold the lower end portion of the windshield glass 1 thereby as shown in FIGS. 3 and 4. The cowl cover 6 also serves as a sealing member of a bonnet (not shown in the figures) openably and closably provided on the upper side of the motor room M.

The dynamic damper 7 is provided as an additional vibration system in the middle of the cowl top 3 in the vehicle width direction with respect to a main vibration system in which glass support rigidity of the cowl top 3 is a main spring and the windshield glass 1 is a main mass. The dynamic damper 7 includes an additional spring and an additional mass. A resonance frequency fd is set for the dynamic damper 7 in order to suppress a primary resonance mode vibrating in the front-back direction of the vehicle in the resonance caused by vibration input at the lower end of the windshield glass 1.

The resonance frequency fd of the dynamic damper 7 is represented by the following formula (1) when the additional spring is defined as k and the additional mass is defined as m.

$$Fd = 1/(2\pi)\sqrt{(k/m)} \quad (1)$$

Namely, the resonance frequency fd of the dynamic damper 7 uses the additional spring k and the additional mass m as frequency adjustment members. For example, when the additional spring k is determined, the resonance frequency fd shifts to a lower frequency as the additional mass m is increased, and the resonance frequency fd shifts to a higher frequency as the additional mass m is decreased.

The dynamic damper 7 according to Example 1 utilizes a marking plate provided in the cowl top 3 to mark the chassis number of the vehicle.

Figure 2:
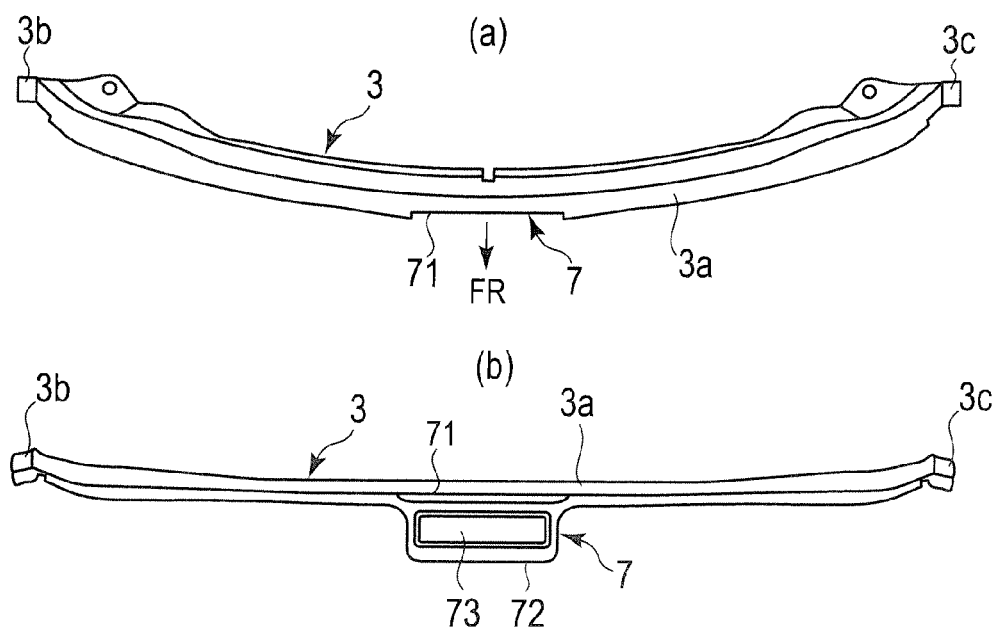
FIG. 2($a$) is a plan view and FIG. 2($b$) is a front view each showing a cowl top in the windshield glass support structure according to Example 1.
Figure 5:
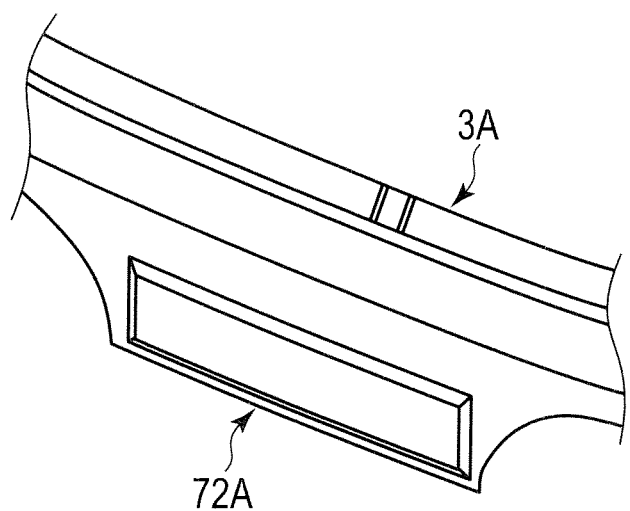
FIG. 5 is a perspective view showing a marking plate of a cowl top in a windshield glass support structure according to a comparative example.
Figure 6:
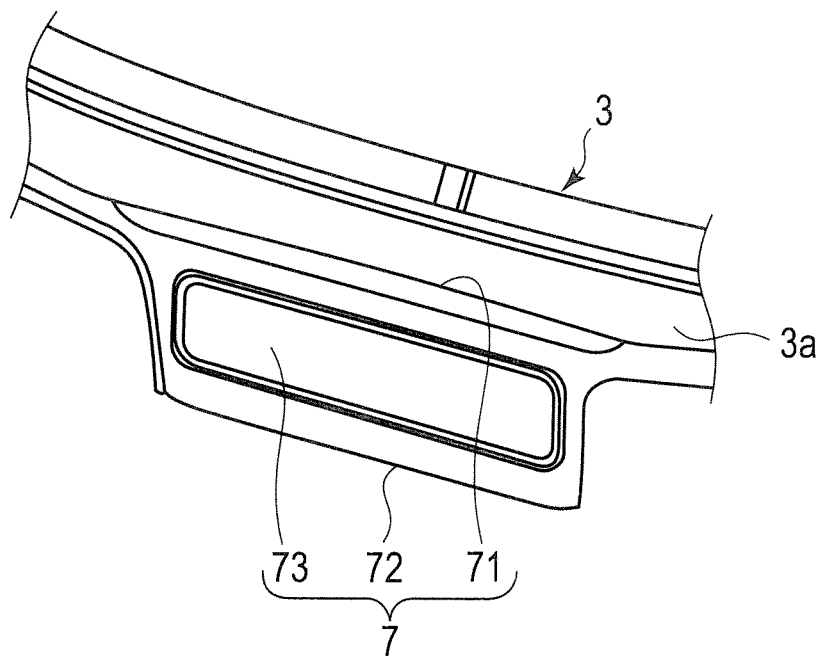
FIG. 6 is a perspective view showing a marking plate of the cowl top in the windshield glass support structure according to Example 1.

As a comparative example, as shown in FIG. 5, a marking plate 72A extends downward directly from the middle curved portion of a cowl top 3A to be integrated with the cowl top due to high fixing rigidity in the front-back direction of the vehicle. On the other hand, according to Example 1 as shown in FIGS. 2 and 6, the cowl top 3 is provided with a linear portion 71 formed in such a manner that the middle curved portion of the cowl top 3 is straightened in the vehicle width direction. The linear portion 71 reduces fixing rigidity in the front-back direction of the vehicle to allow for easy elastic deformation to serve as an additional spring. In addition, a marking plate 72 (a flat plate portion) continuously extending downward from the linear portion 71 is further elongated so as to be slightly longer than the marking plate of the comparative example to increase the mass by the elongated volume to serve as an additional mass. The marking plate 72 includes a marking surface 73 on which the chassis number of the vehicle is marked to fulfill the original role.

Next, the functions will be explained. First, "a problem of the windshield glass support structure according to the comparative example" will be explained. Then, the functions in the windshield glass support structure of Example 1 will be explained while dividing into the sections of "a damping mechanism of the dynamic damper", "a setting function of the resonance frequency of the dynamic damper", and "a suppressing function of low frequency noise inside the vehicle".

[Problem of Windshield Glass Support Structure According to Comparative Example]

When it is assumed that a pedestrian hits the head against the lower end portion of the windshield glass, the property to reduce the impact on the head is referred to as "a pedestrian protection property". The pedestrian protection property is represented by HIC (head injury criteria) that is an index indicating the impact level applied to the head by the lower end portion of the windshield glass.

With regard to the requirement of the pedestrian protection, if the cross-section of the air box supporting the lower end portion of the windshield glass is a closed cross-section, the rigidity of the air box increases and as a result, it may be difficult to attain the target of the HIC. Therefore, the cross-section of the air box tends to be an open cross-section having lower rigidity than the closed cross-section to attain the target of the HIC.

Here, it is assumed that the windshield glass support structure according to the comparative example is a structure in which the lower end portion of the windshield glass is supported by the air box having an open cross-section, and there is no setting of the dynamic damper. In the structure of the comparative example, the numerical target of the HIC can be achieved since the cross-section of the air box is the opened cross-section. However, as the numerical target of HIC is lowered for a higher pedestrian protection property, the support rigidity of the lower end portion of the windshield glass is decreased.

Figure 7:
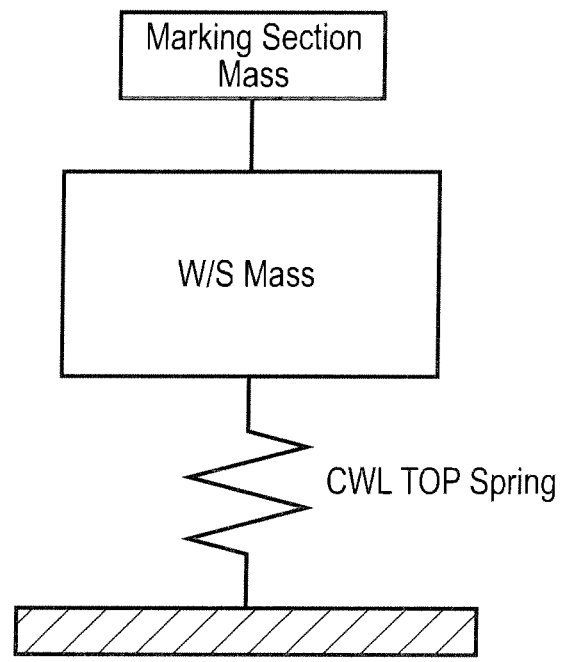
FIG. 7 is a diagram showing a vibration model in the windshield glass support structure according to the comparative example.

That is, as shown in FIG. 7, the windshield glass support structure according to the comparative example may be represented by a vibration model in which the windshield glass is a mass (W/S mass) and the front-back support rigidity of the cowl top is a spring (CWL TOP spring). In this case, the mass of the windshield glass includes a mass of the cowl top and a mass of the marking plate (a marking portion mass). In a primary resonance frequency fw of the resonance in the lower end portion of the windshield glass represented by the vibration model, the mass of the windshield glass is high, and the front-back support rigidity of the cowl top (i.e. a spring constant) is low. Accordingly, the primary resonance frequency fw is within a low frequency band such as 60 Hz (refer to the formula (1)).

Figure 8:
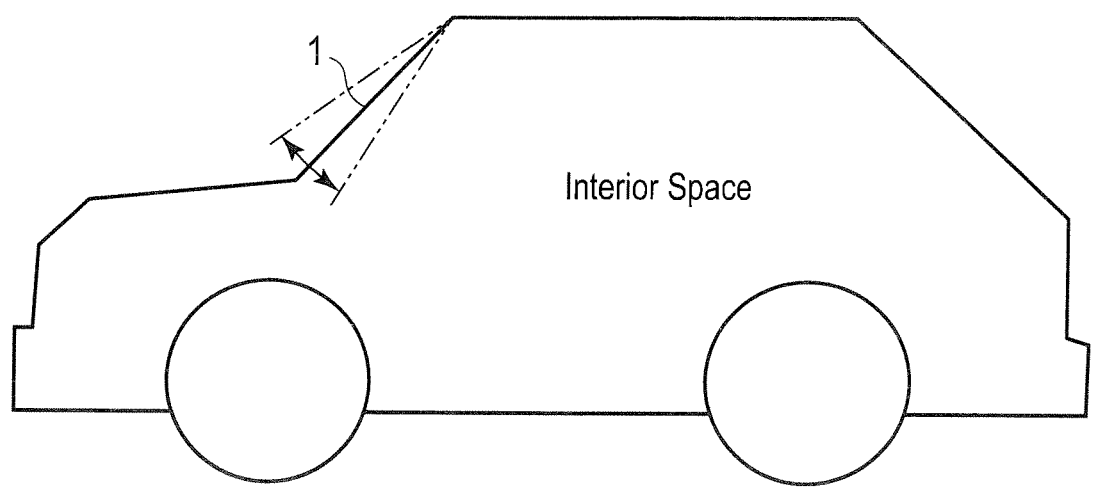
FIG. 8 is an explanatory view showing a generation mechanism of low frequency noise inside a vehicle to which the windshield glass support structure according to the comparative example is applied.

When a vibration in the low frequency band is input from the tires of the running vehicle adopting the windshield glass support structure according to the comparative example, the lower end portion of the windshield glass causes primary resonance. As shown in FIG. 8, the primary resonance is a vibration with large vibration amplitude in the front-back direction of the vehicle in a primary vibration mode in which the both ends of the windshield glass in the vehicle width direction are resonance nodes, and the middle of the windshield glass in the vehicle width direction is a resonance antinode. Accordingly, a vibration system of the primary resonance at the lower end portion of the windshield glass causes low frequency noise inside the vehicle.

Figure 9:
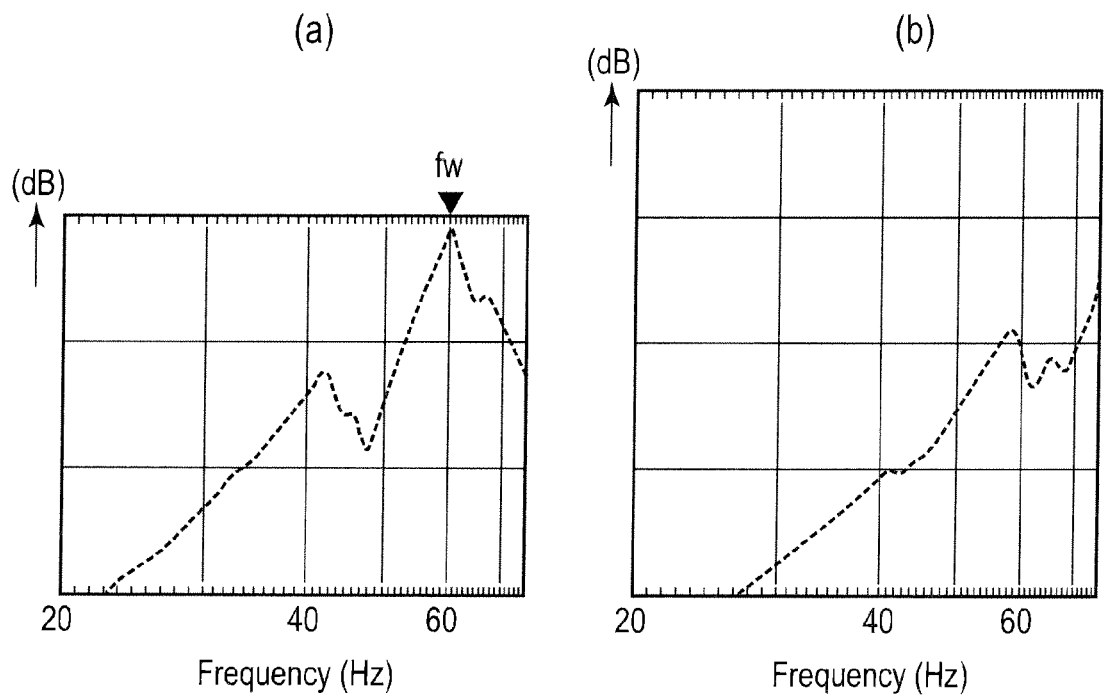
FIG. 9($a$) is a chart showing a frequency property of a vibration level in a lower end middle portion of a windshield glass of the vehicle to which the windshield glass support structure according to the comparative example is applied, and FIG. 9($b$) is a chart showing a frequency property of a vibration level around the cowl top.
Figure 10:
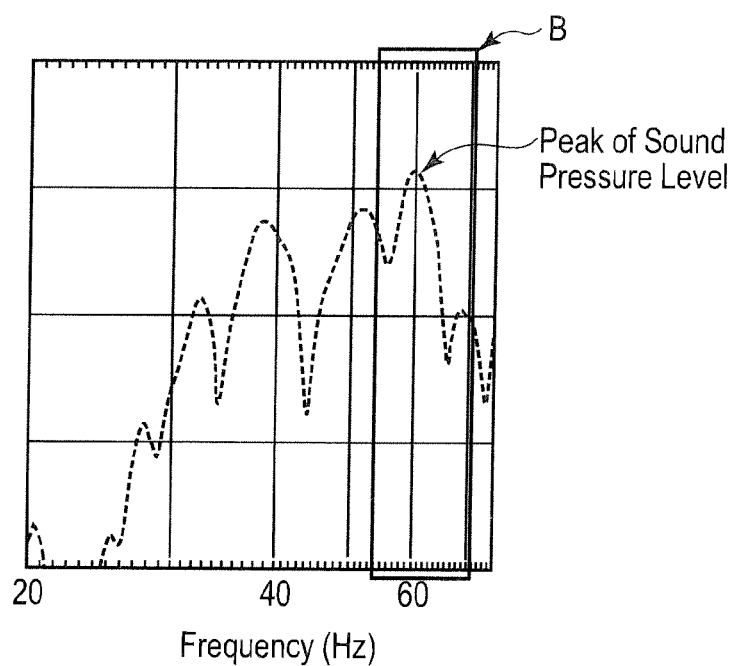
FIG. 10 is a chart showing a frequency property of a sound pressure level in an interior space of the vehicle to which the windshield glass support structure according to the comparative example is applied.

Note that, in the windshield glass support structure according to the comparative example, as shown in the frequency property in the lower end middle portion of the windshield glass in FIG. 9(*a*), the primary resonance frequency fw in the lower end portion of the windshield glass appears approximately in 60 Hz, which is the peak of the vibration level. In addition, as shown in the frequency property around the cowl top in FIG. 9(*b*), the vibration level around the cowl top gradually increases with the increase in frequency, and reaches a high vibration level (vibration amplitude) in the primary resonance band around 60 Hz. Further, as shown in the frequency property of a sound pressure level inside the vehicle in FIG. 10, a peak characteristic with a higher sound pressure level appears in a primary resonance band B around 60 Hz. It is understood that the peak characteristic of the sound pressure level is a factor of generation of the low frequency noise.

Thus, if the support rigidity of the lower end portion of the windshield glass is reduced according to the requirement of the pedestrian protection, the lower end portion of the windshield glass causes the primary resonance because of the reduction in the support rigidity when the vibration in the low frequency band is input. As a result, the low frequency noise such as road noise and muffled sound is caused.

Based on the cause of the low frequency noise, the inventors analyzed the generation mechanism of the low frequency noise by the vibration input. As a result, the inventors found out that the low frequency noise was caused by the mechanism in which the vibration input system was the tires and wheels, the transfer system of the vibration input was the suspension and the vehicle body, and the main factor to cause the low frequency noise inside the vehicle was the windshield glass.

In particular, the electric vehicle according to Example 1 is driven by the silent electric motor 13. Therefore, quietness inside the vehicle is ensured sufficient to enjoy conversation without feeling stress compared with an engine-driven vehicle. Under the atmosphere of the low frequency noise caused inside the vehicle while maintaining the quietness, the low frequency noise is an unpleasant sound for passengers more than the sound caused inside the engine-driven vehicle, which makes the passengers feel uncomfortable.

[Damping Mechanism of Dynamic Damper]

In view of the problem of the low frequency noise described above, as one of the solutions, there is a method of shifting the primary resonance frequency at the lower end portion of the windshield glass to a higher frequency by increasing the support rigidity of the cowl top in order to suppress the low frequency noise. Although this method can suppress the low frequency noise, the performance of the pedestrian protection is decreased because of the increase in the support rigidity of the cowl top.

Another method to solve the problem of the low frequency noise described above is providing the braces having a closed cross-section in the air box structure having an open cross-section as described in Patent Document 1. However, even though such a structure is easily deformed to absorb impact when the impact is input from above, the support rigidity of the cowl top increases due to the braces having the closed cross-section and therefore, the increase in the support rigidity definitely influences the pedestrian protection. Accordingly, as the performance of the pedestrian protection to be aimed is higher, the difficulty to achieve the performance increases.

Thus, according to Example 1, the dynamic damper 7 is provided while the lower end portion of the windshield glass 1 is supported by the air box 14 having the open cross-section in order to ensure both the performance of the pedestrian protection and the suppression of the low frequency noise. Next, the damping mechanism of the dynamic damper will be explained.

"The dynamic damper" used herein is an additional vibration system composed of an additional spring and an additional mass, and is referred to as a dynamic vibration absorber having a specific resonance frequency. Here, the main vibration system as a target of vibration suppression is defined as X, and the additional vibration system corresponding to the dynamic damper is defined as Y It is assumed that the resonance frequency of the additional vibration system Y corresponds to the resonance frequency of the main vibration system X. In this case, the damping function of the dynamic damper is such that the main vibration system X theoretically does not vibrate but only the additional vibration system Y vibrates when a vibration of a resonance point frequency is input to a coupled vibration system X+Y. In other words, the additional mass vibrates in an antiphase with respect to a vibration phase of the main vibration system X so as to counteract a vibration force of the main vibration system by a vibration force of the additional mass, thereby suppressing the vibration of the main vibration system. Note that, in the coupled vibration system X+Y, the resonance frequency (peak) of the main vibration system X is separated into two resonance frequencies (peaks) because of the increase of the degree of vibrational freedom. The two resonance frequencies (peaks) appear around a resonance frequency (dip) tuned by the additional vibration system Y in the frequency band, and have a vibration level lower than that of the one resonance frequency (peak).

The dynamic damper has a great advantage of being able to ensure the damping function by adding a small mass without requiring a significant design change of the main vibration system. In addition, the damping function of the dynamic damper reduces the vibration level when the main vibration system starts the resonance vibration. Here, it can be said that the damping function of the dynamic damper is apparently equivalent to the function to increase the support rigidity of the main vibration system to reduce the vibration level only in the resonance frequency band of the main vibration system.

Therefore, in the windshield glass support structure, it is possible to suppress the low frequency noise while ensuring the pedestrian protection performance by reducing the support rigidity of the cowl top to a lower level due to the use of the dynamic damper. Namely, both the performance of the pedestrian protection and the suppression of the low frequency noise can be achieved.

[Setting Function of Resonance Frequency of Dynamic Damper]

In Example 1, the resonance frequency fd is set for the dynamic damper 7 in order to suppress the primary resonance vibration mode in the front-back direction of the vehicle in the resonance caused by the vibration input at the lower end portion of the windshield glass 1. Hereinafter, the setting function of the resonance frequency fd in the dynamic damper 7 according to Example 1 will be explained.

Figure 11:
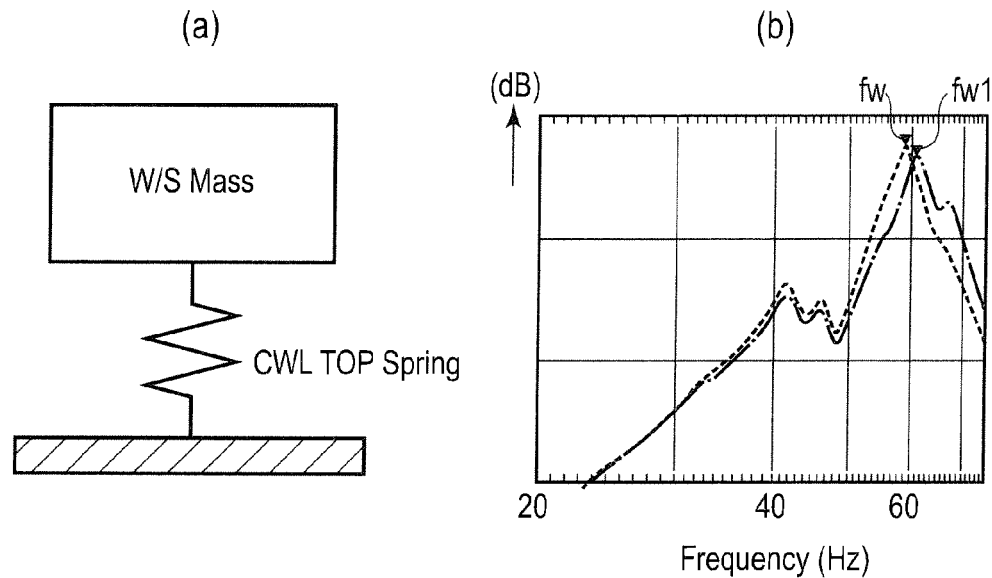
FIG. 11($a$) is a diagram showing a vibration model in a case of excluding a mass of a marking section in the windshield glass support structure according to Example 1, and FIG. 11($b$) is a chart showing a frequency property of a vibration level in a lower end middle portion of the windshield glass.

As shown in FIG. 11(a), the main vibration system X provided with the dynamic damper 7 of Example 1 is represented by a vibration model in which the windshield glass 1 is a mass (W/S mass) and the front-back support rigidity of the cowl top 3 is a spring (CWL TOP spring). In this case, the mass of the windshield glass 1 includes a mass of the cowl top 3. A primary resonance frequency fw1 of the lower end of the windshield glass 1 represented by the vibration model described above, for example, shifts to a higher frequency from fw=60 Hz (the comparative example) to result in fw1=approximately 61 Hz, as shown in FIG. 11(b). This is because the main mass is reduced by excluding the mass of the marking plate from the mass of the windshield glass 1 of the comparative example. Thus, it may be difficult to significantly change the primary resonance frequency only by the mass adjustment.

Figure 12:
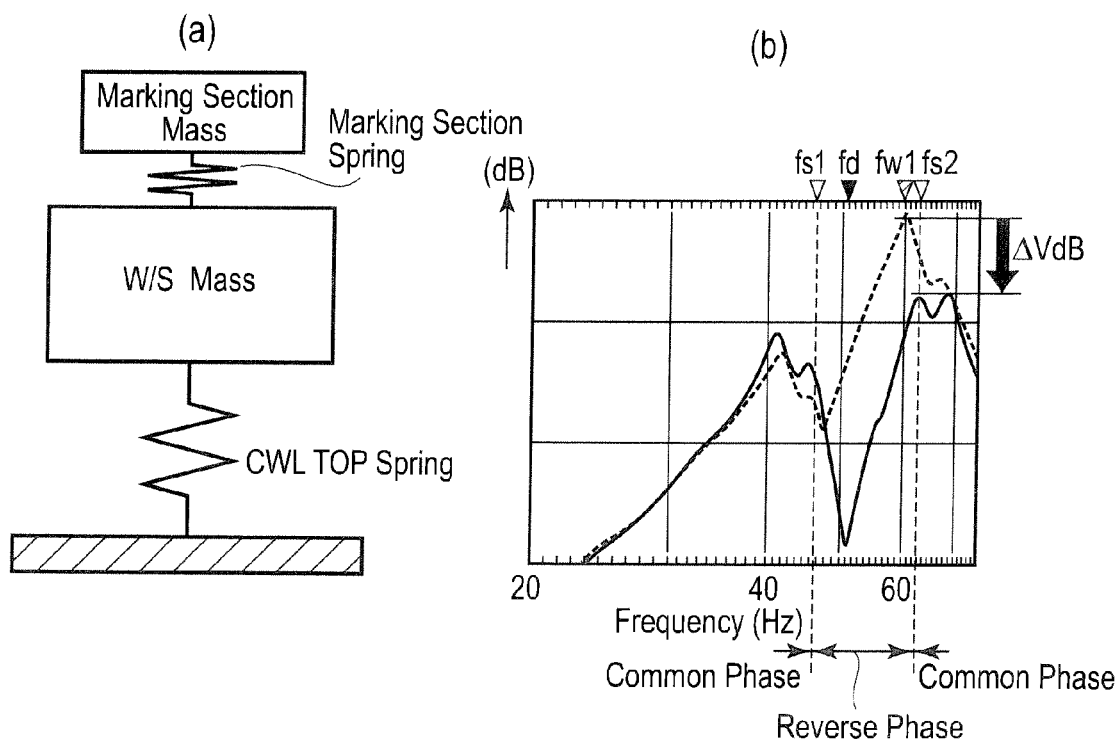
FIG. 12($a$) is a diagram showing a vibration model in a case of adding the marking section mass and a marking section spring in the windshield glass support structure according to Example 1, and FIG. 12($b$) is a chart showing the frequency property of the vibration level in the lower end middle portion of the windshield glass.

As shown in FIG. 12(a), the vibration model in which the dynamic damper 7 as the additional vibration system Y is added to the main vibration system X is obtained in such a manner that a marking section mass (an additional mass) and a marking section spring (an additional spring) are added to the vibration model shown in FIG. 11(a). As shown in FIG. 12(b), the resonance frequency fd of the dynamic damper 7 is fd=approximately 52 Hz in the dip position at which the vibration level is lowest in the vibration level property of the lower end middle portion of the windshield glass 1. In other words, the primary resonance frequency fw1 of the main vibration system X does not correspond to the resonance frequency fd of the additional vibration system Y, which is lower than the primary resonance frequency fw1.

Figure 13:
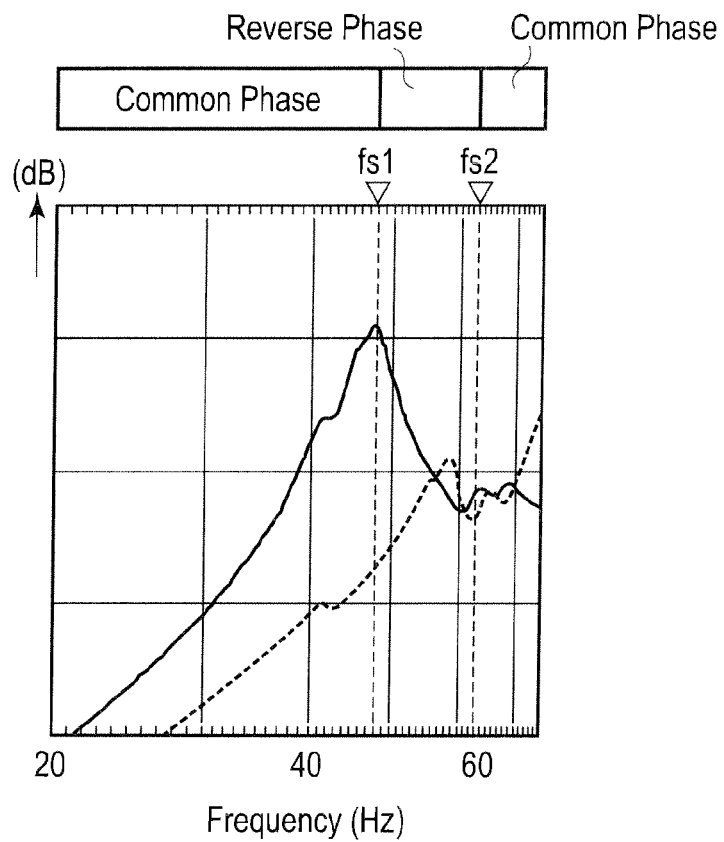
FIG. 13 is a chart showing a frequency property of a vibration level around the cowl top in a case of adding the marking section mass and the marking section spring in the windshield glass support structure according to Example 1.

However, as is apparent from FIG. 12(b), two resonance frequencies fs1 and fs2 appearing in the main vibration system X are fs1=approximately 46 Hz and fs2=approximately 63 Hz interposing the dip position (fd=approximately 52 Hz) therebetween. Thus, the main vibration system X is separated into the two resonance frequencies fs1 and fs2, and the range between the two resonance frequencies fs1 and fs2 is an antiphase range in which the damping function is carried out by the dynamic damper 7. In the antiphase range, as shown in the frequency property of the vibration level around the cowl top in FIG. 13, the vibration around the cowl top is at the highest vibration level in the resonance frequency fs1 (approximately 46 Hz). Then, the vibration level around the cowl top 3 is decreased toward the resonance frequency fs2 (approximately 63 Hz).

As described above, it is ideal for the resonance frequency fd of the dynamic damper 7 to correspond to the primary resonance frequency fw1 (=approximately 61 Hz) of the lower end of the windshield glass 1. However, these frequencies do not completely correspond to each other, and the resonance frequency fd of the dynamic damper 7 is slightly lower than the primary resonance frequency fw1 of the lower end of the windshield glass 1. Namely, even if the two resonance frequencies fw1 and fd do not completely correspond to each other, the resonance frequency of the main vibration system X is separated into the two resonance frequencies fs1 and fs2. Thus, it is recognized that the damping function is achieved by the dynamic damper 7.

Therefore, although it is preferable that the two resonance frequencies fw1 and fd correspond to each other when the resonance frequency fd of the dynamic damper 7 is set (tuned), the resonance frequency fd of the dynamic damper 7 does not necessarily correspond to the primary resonance frequency fw1 of the lower end of the windshield glass 1. For example, as in the case of Example 1, the two resonance frequencies fw1 and fd are only required to be included in the antiphase range between the resonance frequencies fs1 and fs2 in which the damping function is achieved by the dynamic damper 7. That is, the resonance frequency fd of the dynamic damper 7 may be adjusted either slightly higher than or slightly lower than the primary resonance frequency fw1, as long as the condition that the resonance frequency of the main vibration system X is separated into the two resonance frequencies is fulfilled.

In the case of Example 1, the portions corresponding to the additional mass and the additional spring of the dynamic damper 7 are integrated with the cowl top 3 using the marking plate 72. In other words, the additional mass is tuned by the dimension (mass) of the marking plate 72, and the additional spring is tuned by the tip line (linearization) of the cowl top 3. The resonance frequency fd of the dynamic damper 7 is set by the tuning functions, so that the primary resonance frequency fw1 of the lower end of the windshield glass 1 is separated into the two resonance frequencies fs1 and fs2 to reduce the vibration level of the primary resonance frequency fw.

[Suppressing Function of Low Frequency Noise Inside Vehicle]

When moving on irregular roads, a vibration from the tires as an input system reaches the windshield glass 1 via the suspension and the body as a transfer system, so as to vibrate the windshield glass 1 in the front-back direction of the vehicle due to the primary resonance. Then, once the vibration input reaches the resonance frequency band of the dynamic damper 7, the additional mass of the marking plate 72 vibrates in the antiphase with respect to the vibration phase in which the windshield glass 1 vibrates. As a result, the vibration level (the amplitude) of the lower end of the windshield glass 1 by the primary resonance is reduced to a lower level.

Figure 14:
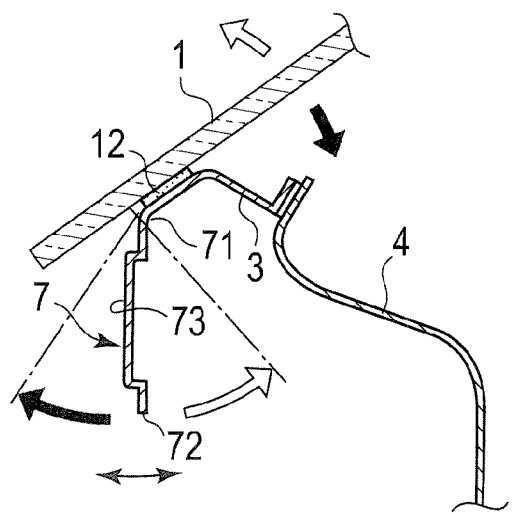
FIG. 14 is an explanatory view showing an action to reduce the vibration level in the lower end middle portion of the windshield glass by a dynamic damper in the windshield glass support structure according to Example 1.

In other words, in the case in which the vibration frequency of the vibration input is within the range between the resonance frequency fs1 (approximately 46 Hz) and the resonance frequency fs2 (approximately 63 Hz), the range is the antiphase range of the dynamic damper 7. As a result, as shown in FIG. 14, the additional mass of the marking plate 72 vibrates in the antiphase with respect to the vibration phase in which the windshield glass 1 vibrates. Due to the antiphase vibrating action of the marking plate 72 in which the linear portion 71 is the axis of the vibration, as shown in FIG. 12(b), the vibration level of the primary resonance frequency fw1 (=approximately 61 Hz) of the lower end of the windshield glass 1 is reduced by the vibration width ΔV (dB).

The primary resonance of the windshield glass 1 is in the vibration mode in which the both ends of the windshield glass 1 in the vehicle width direction are the resonance nodes, and the middle of the windshield glass 1 in the vehicle width direction is the resonance antinode (see FIG. 8). The dynamic damper 7 is provided in the middle of the cowl top 3 in the vehicle width direction, which is the position corresponding to the antinode of the primary resonance mode. Accordingly, it is possible to effectively reduce the vibration level (the amplitude) of the lower end portion of the windshield glass 1 compared to the case that the dynamic damper 7 is provided in the other position other than the middle of the cowl top 3 in the vehicle width direction.

As described above, the dynamic damper 7 provided in the middle of the cowl top 3 in the vehicle width direction effectively reduces the vibration level of the primary resonance mode in the resonance caused by the vibration input at the lower end of the windshield glass 1. Thus, the damping function of the dynamic damper 7 can effectively reduce the vibration level (the amplitude) of the lower end portion of the windshield glass 1 to a lower level.

As a result, it is possible to prevent the interior space R from becoming a low frequency noise atmosphere accompanied with a room volume variation (a pressure variation) caused by the primary resonance vibration of the windshield glass 1.

Figure 15:
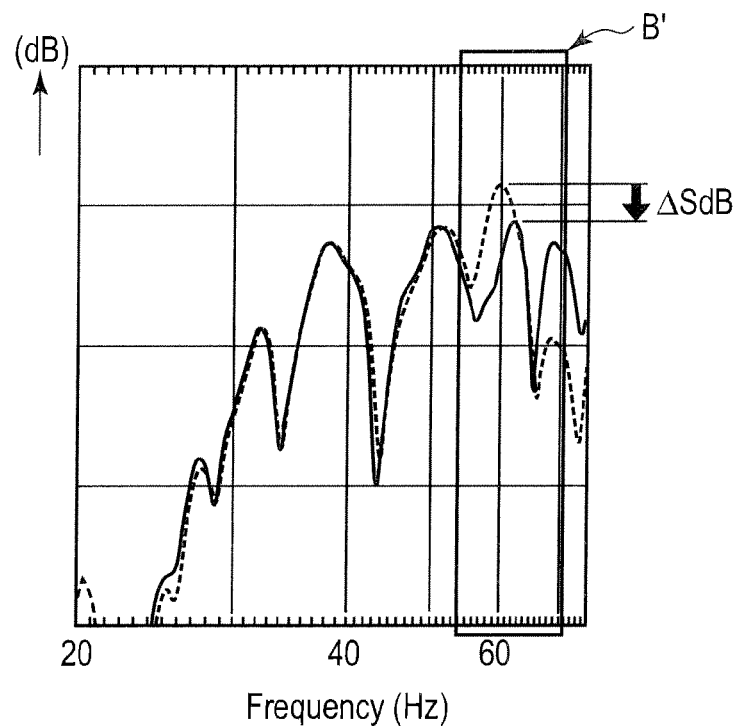
FIG. 15 is a chart showing a frequency property of a sound pressure level in an interior space of the electric vehicle to which the windshield glass support structure according to Example 1 is applied.

Namely, as shown in a primary resonance range B' around 60 Hz in the frequency property of the interior sound pressure level in FIG. 15, the sound pressure level is decreased, and the sound pressure width is reduced by ΔS (dB) compared with the sound pressure level of the comparative example. Due to the reduced sound pressure width ΔS (dB), it is possible to reduce the low frequency noise such as road noise and muffled sound to a level that is not unpleasant to the ears of the passengers.

Note that the frequency property of FIG. 15 is an example in which the sound pressure level at the inner ear position of a passenger sitting in a front seat is measured when the mounting points of the front suspension and the rear suspension in the vehicle are vibrated per unit force. In other words, the frequency property of FIG. 15 is data obtained in such a manner that the low frequency noise felt by the passenger in the interior space is precisely imitated by the actual vibration input.

Next, the effects will be explained. The windshield glass support structure according to Example 1 can obtain the following effects.

(1) In the windshield glass support structure in which the lower end portion of the windshield glass 1 of the vehicle is supported by the lower end support member (the cowl top 3) extending in the vehicle width direction, when the both ends of the windshield glass 1 in the vehicle width direction are the resonance nodes, the dynamic damper 7 is provided at the position corresponding to the resonance antinode in the lower end support member in the vehicle width direction. The dynamic damper 7 is the additional vibration system including the additional spring and the additional mass with respect to the main vibration system in which the glass support rigidity of the lower end support member is the main spring and the windshield glass 1 is the main mass. Further, the resonance frequency fd of the dynamic damper 7 is set in the frequency band in which the additional mass vibrates in the antiphase with respect to the vibration phase in which the lower end portion of the windshield glass 1 vibrates in the resonance mode in the front-back direction of the vehicle caused by the vibration input.

Accordingly, it is possible to ensure quietness in the interior space by suppressing the generation of the low frequency noise during moving caused by the windshield glass 1 as the vibration system.

(2) The dynamic damper 7 is provided in the middle of the lower end support member in the vehicle width direction. The resonance frequency fd of the dynamic damper 7 is set in the frequency band in which the additional mass vibrates in the antiphase with respect to the vibration phase in which the lower end portion of the windshield glass 1 vibrates in the primary resonance mode among the resonance modes in the front-back direction of the vehicle caused by the vibration input.

Therefore, in addition to the effect (1), it is possible to effectively suppress the low frequency noise caused by the vibration in the primary resonance mode among the resonance modes caused at the lower end portion of the windshield glass 1 in the front-back direction of the vehicle.

(3) The lower end support member has a curved shape formed in such a manner that the center portion projects toward the front of the vehicle and the both side portions extend toward the rear of the vehicle. The dynamic damper 7 includes the linear portion 71 serving as the additional spring formed in such a manner that the middle curved portion of the lower end support member is straightened in the vehicle width direction, and the flat plate portion (the marking plate 72) serving as the additional mass continuously extending downward from the linear portion 71.

Therefore, in addition to the effects (1) and (2), the resonance mode of the lower end portion of the windshield glass 1 in the front-back direction of the vehicle can be suppressed due to the dynamic damper 7 integrated with the lower end support member without increasing the number of the components.

(4) The flat plate portion is the marking plate 72 including the marking surface 73 on which the chassis number of the vehicle is marked.

Therefore, in addition to the effect (3), the dynamic damper 7 can be easily provided while preventing an increase in cost and minimizing the design change by utilizing the existing marking plate 72.

(5) The lower end support member is the cowl top 3 fixed along the upper end portion of the dash upper panel 4 and including the glass support surface 3a to support the lower end portion of the windshield glass 1. The cross-section of the air box 14 including the cowl top 3 and the dash upper panel 4 is the open cross-section in which the gap t is continuously provided in the vehicle width direction.

Therefore, in addition to the effects (1) to (4), it is possible to achieve both the performance of the pedestrian protection by reducing the support rigidity of the lower end of the windshield glass 1 and the suppression of the low frequency noise by suppressing the vibration of the lower end portion of the windshield glass 1.

Example 2

Example 2 is an example of suppressing low frequency noise caused by a vibration in a tertiary resonance mode among the resonance modes at the lower end portion of the windshield glass in the front-back direction of the vehicle.

Figure 16:
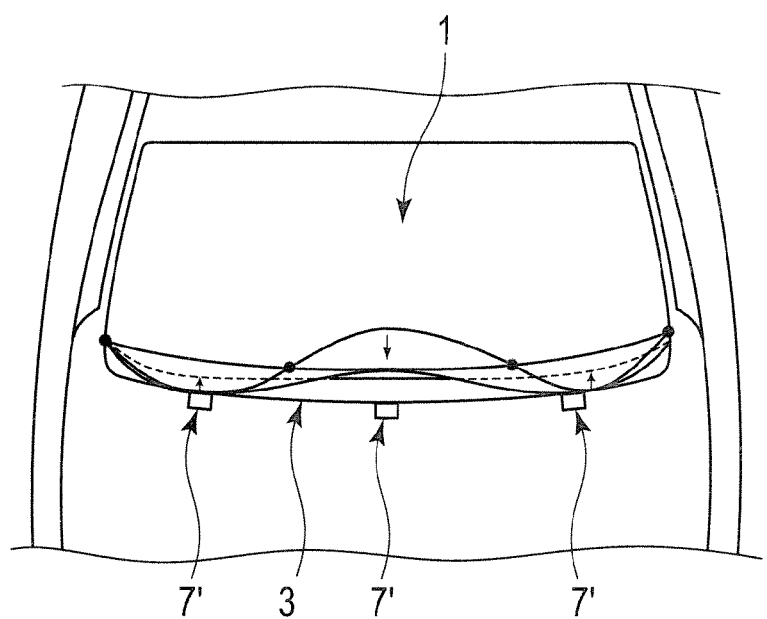
FIG. 16 is a schematic plan view showing an electric vehicle to which a windshield glass support structure according to Example 2 is applied.

FIG. 16 is a schematic plan view showing an electric vehicle (one of electrically-powered vehicles) to which a windshield glass support structure according to Example 2 is applied. According to Example 2, as shown in FIG. 16, dynamic dampers 7' are provided in the positions corresponding to each resonance antinode in the cowl top 3 serving as the lower end support member in the vehicle width direction when the both ends of the windshield glass 1 in the vehicle width direction are the resonance nodes. In other words, the dynamic dampers 7' are provided in the three portions; one is located in the middle of the cowl top 3 in the vehicle width direction and the other two are located at the one-sixth position from each end of the cowl top 3. As in the case of Example 1, each of the dynamic dampers 7' includes the additional mass and the additional spring serving as the additional vibration system with respect to the main vibration system in which the glass support rigidity of the cowl top 3 is the main spring and the windshield glass 1 is the main mass.

Example 1 shows the measure for the primary resonance mode, which is implemented by providing the dynamic damper 7 in the middle of the cowl top 3. With regard to the measure for the tertiary resonance mode, for example, the dynamic dampers 7' are provided in the three portions corresponding to the resonance antinodes in the tertiary resonance mode in the cowl top 3. The dynamic dampers 7' achieve the damping function to suppress the vibration as in the case of Example 1, and the vibration level of the tertiary resonance is thus reduced. Accordingly, the low frequency noise caused by the vibration in the tertiary resonance mode can be suppressed.

Example 3

Example 3 is an example of suppressing low frequency noise caused by a vibration in an asymmetric secondary resonance mode among the resonance modes at the lower end portion of the windshield glass in the front-back direction of the vehicle.

Figure 17:
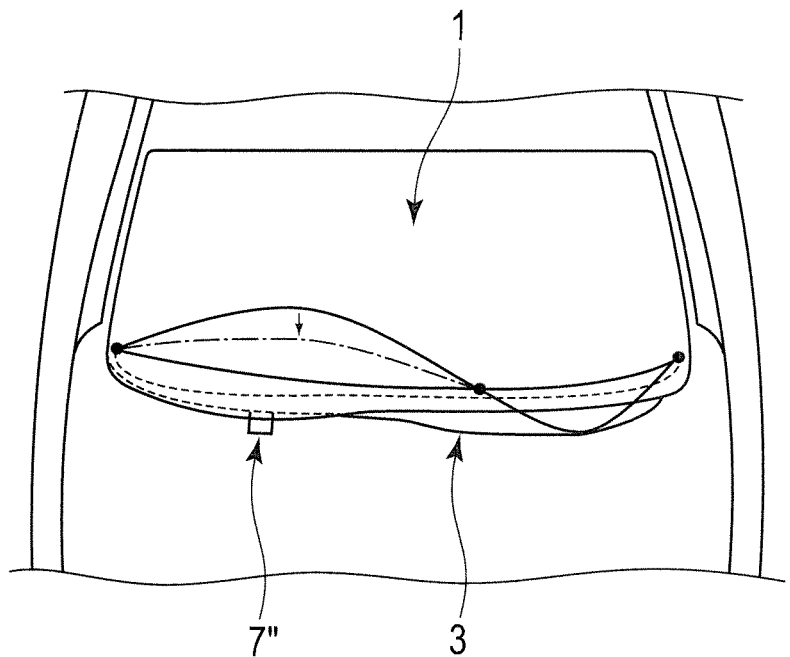
FIG. 17 is a schematic plan view showing an electric vehicle to which a windshield glass support structure according to Example 3 is applied.

FIG. 17 is a schematic plan view showing an electric vehicle (one of electrically-powered vehicles) to which a windshield glass support structure according to Example 3 is applied. In the asymmetric secondary resonance mode as shown in FIG. 17, the resonance antinodes of the cowl top 3 in the vehicle width direction appear in two portions when the both ends of the windshield glass 1 in the vehicle width direction are the resonance nodes. That is, there are two resonance antinodes appearing in the two portions with large amplitude and small amplitude as shown in FIG. 17. Thus, a dynamic damper 7" is provided at the position corresponding to the resonance antinode with the large amplitude. In other words, the dynamic damper 7" is provided at the offset position from the middle of the cowl top 3 in the vehicle width direction. As in the case of Example 1, the dynamic damper 7" includes the additional mass and the additional spring serving as the additional vibration system with respect to the main vibration system in which the glass support rigidity of the cowl top 3 is the main spring and the windshield glass 1 is the main mass.

When the shape and rigidity of the cowl top 3 is asymmetric in the vehicle width direction, the asymmetric secondary resonance mode appears. However, the dynamic damper 7" is provided at the position corresponding to the resonance antinode with the large amplitude as in the case of Example 2. As a result, the damping function to suppress the vibration as in the case of Example 1 is achieved so that the vibration level of the secondary resonance is reduced. Accordingly, the low frequency noise caused by the vibration in the secondary resonance mode can be suppressed.

Although the windshield glass support structure according to the present invention has been described based on Examples 1 to 3, the specific configurations are not limited to these examples.

Example 1 is described as the example of suppressing the low frequency noise caused by the vibration in the primary resonance mode among the resonance modes of the lower end portion of the windshield glass in the front-back direction of the vehicle. Example 2 is described as the example of suppressing the low frequency noise caused by the vibration in the tertiary resonance mode. Example 3 is described as the example of suppressing the low frequency noise caused by the vibration in the asymmetric secondary resonance mode. The order of the resonance mode in the front-back direction of the vehicle is not limited to that described in respective Examples 1 to 3. For example, the dynamic damper for multiple resonance modes having various orders may be provided by combining Examples 1 to 3. Since the increase of the mass added to the dynamic damper is small, the influence on the resonance frequency of the resonance mode of the other order is reduced to a small level, which is different from the case in which the braces having a closed cross-section are provided at the portions corresponding to the resonance nodes in the vehicle width direction. In other words, the dynamic damper of each order individually achieves the damping function with respect to the resonance modes of the different orders.

In Example 1, the linear portion 71 formed in such a manner that the middle curved portion of the cowl top 3 is straightened in the vehicle width direction serves as the additional spring, and the marking plate 72 continuously elongated downward from the linear portion 71 serves as the additional mass. However, an additional dynamic damper may be added to the cowl top instead of utilizing the existing marking plate 72.

Figure 18:
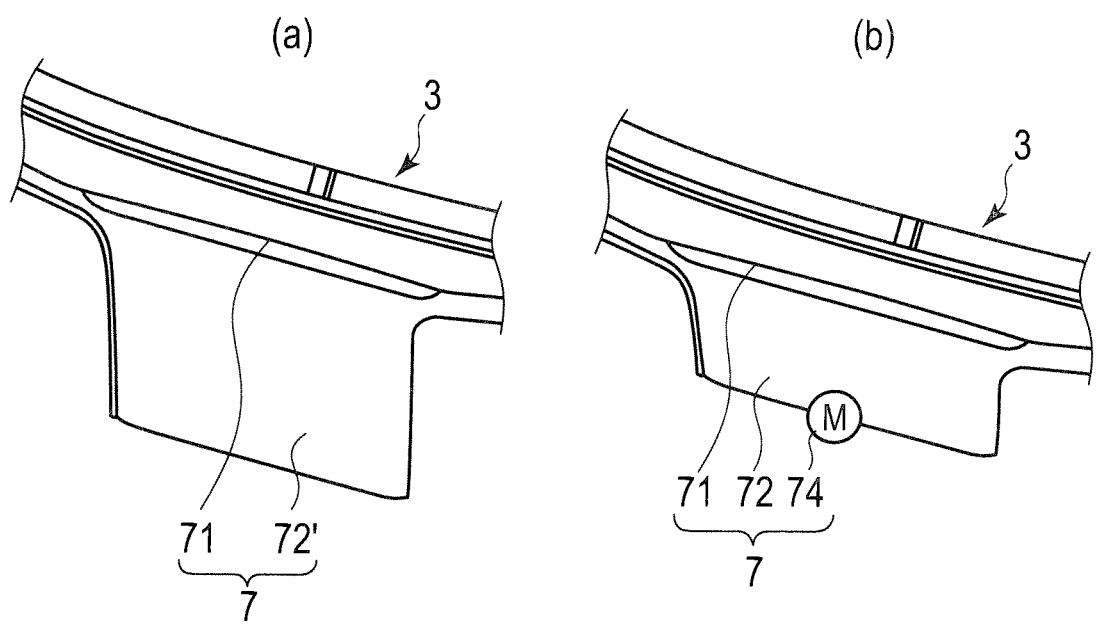
FIG. 18(a) is a perspective view showing an application example 1.
FIG. 18(b) is a perspective view showing an application example 2, of the windshield glass support structure adopting the dynamic damper using the marking plate.

In particular, in Example 1, the lower end of the marking plate 72 serving as the additional mass is slightly elongated. However, the elongation of the lower end of the cowl top with the mass adjusted (mass/position) can have a function as the dynamic damper so as to control the resonance of the windshield glass. For example, as shown in FIG. 18(*a*), the lower end of the cowl top may serve as a marking plate 72' elongated downward lower than Example 1. Alternatively, the lowest part of the marking plate 72 may be provided with a mass 74, as shown in FIG. 18(*b*).

In Example 1, the linear portion 71 formed in such a manner that the curved portion is straightened serves as the additional spring. However, a known fragile structure such as a notched structure, a slit structure and a thin-wall structure may be applied to serve as the additional spring. Further, two or more of these fragile structures and the linear portion 71 may be combined to serve as the additional spring.

In Example 1, the cross-section of the air box 14 including the cowl top 3 and the dash upper panel 4 is the open cross-section in which the gap t is continuously provided in the vehicle width direction. However, the cross-section of the air box 14 may be the closed cross-section so as to focus on suppressing the vibration in the resonance mode (such as the primary resonance mode, the secondary resonance mode or the tertiary resonance mode) at the lower end portion of the windshield glass.

Examples 1 to 3 are described as the examples in which the windshield glass support structure is applied to the electric vehicle. However, the windshield glass support structure can be applied not only to other electrically-powered vehicles such as a hybrid vehicle and a fuel cell vehicle but also to engine-driven vehicles. When the windshield glass support structure is applied to the electric vehicle in which quietness in the interior room is maintained, it is possible to more effectively suppress the low frequency noise unpleasant to the ears of the passengers compared with the engine-driven vehicle.

The entire content of Japanese Patent Application No. P2010-092796 (filed on Apr. 14, 2010) is herein incorporated by reference.

Although the present invention has been described above by reference to the examples, the present invention is not limited to the descriptions thereof, and it will be apparent to those skilled in the art that various modifications and improvements can be made within the scope of the present invention.

INDUSTRIAL APPLICABILITY

For example, during moving on irregular roads, when the vibration input from the tires reaches the windshield glass 1 via the suspension and the body, the lower end portion of the windshield glass is made to vibrate in the resonance mode in the front-back direction of the vehicle. Once the vibration input reaches the resonance frequency band of the dynamic damper, the additional mass vibrates in the antiphase with respect to the vibration phase in which the lower end portion of the windshield glass vibrates. As a result, the vibration level (the amplitude) of the lower end portion of the windshield glass in the front-back direction of the vehicle is effectively reduced.

Further, the resonance mode of the lower end portion of the windshield glass in the front-back direction of the vehicle is the vibration mode in which the both ends of the windshield glass in the vehicle width direction are the resonance nodes.

In addition, the dynamic damper is provided at the position corresponding to the resonance antinode in the lower end support member in the vehicle width direction. Thus, it is possible to effectively reduce the vibration level (the amplitude) of the lower end portion of the windshield glass.

Accordingly, it is possible to suppress the low frequency noise caused by the windshield glass as the vibration system so as to ensure quietness in the interior space even if the vibration to promote the resonance mode in the front-back direction of the vehicle is input.

REFERENCE SIGNS LIST

1 Windshield glass
3 Cowl top (lower end support member)
4 Dash upper panel
5 Dash lower panel
7 Dynamic damper
14 Air box
71 Linear portion
72 Marking plate

The invention claimed is:

1. A windshield glass support structure, comprising:
a lower end support member extending in a width direction of a vehicle to support a lower end portion of a windshield glass, and having a curved shape formed in such a manner that a center portion projects toward a front side of the vehicle and both side portions extend toward a back side of the vehicle,
wherein the lower end support member includes a linear portion formed in such a manner that a middle curved portion of the lower end support member is straightened in the width direction, and a flat plate portion continuously extending downward from the linear portion, and
a resonance frequency of the linear portion and the flat plate portion is set in a frequency band in which the flat plate portion vibrates in an antiphase with respect to a vibration phase in which the lower end portion of the windshield glass vibrates in a resonance mode in a front-back direction of the vehicle caused by a vibration input.

2. The windshield glass support structure according to claim 1, wherein the linear portion and the flat plate portion are provided in a center portion of the lower end support member in the width direction, and
the resonance frequency of the linear portion and the flat plate portion is set in a frequency band in which the flat plate portion vibrates in an antiphase with respect to a vibration phase in which the lower end portion of the windshield glass vibrates in a primary resonance mode among resonance modes in the front-back direction of the vehicle caused by the vibration input.

3. The windshield glass support structure according to claim 1, wherein the flat plate portion is a marking plate having a marking surface on which a chassis number of the vehicle is marked.

4. The windshield glass support structure according to claim 1, wherein the lower end support member is a cowl top fixed along an upper end portion of a dash upper panel to support the lower end portion of the windshield glass, and
a cross-section of an air box including the cowl top and the dash upper panel is an open cross-section in which a gap is provided on an upper side of the air box continuously in the width direction.

* * * * *